US008875176B2

(12) United States Patent
Hill et al.

(10) Patent No.: US 8,875,176 B2
(45) Date of Patent: Oct. 28, 2014

(54) METHOD AND APPARATUS USING LOCATION-BASED COMMUNICATION

(75) Inventors: Nicholas Peter Hill, Atlanta, GA (US); Anthony Duva, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 285 days.

(21) Appl. No.: 12/557,183

(22) Filed: Sep. 10, 2009
(Under 37 CFR 1.47)

(65) Prior Publication Data

US 2011/0061080 A1  Mar. 10, 2011

(51) Int. Cl.
| | |
|---|---|
| *H04N 7/10* | (2006.01) |
| *H04N 7/16* | (2011.01) |
| *H04N 7/173* | (2011.01) |
| *H04W 4/02* | (2009.01) |
| *H04W 4/20* | (2009.01) |
| *H04N 21/488* | (2011.01) |
| *H04N 21/258* | (2011.01) |
| *G01S 19/17* | (2010.01) |
| *H04L 29/08* | (2006.01) |
| *H04W 64/00* | (2009.01) |
| *H04W 24/00* | (2009.01) |

(52) U.S. Cl.
CPC .............. *G01S 19/17* (2013.01); *H04W 4/02* (2013.01); *H04W 4/028* (2013.01); *H04W 64/00* (2013.01); *H04W 24/00* (2013.01); *H04W 4/20* (2013.01); *H04W 4/021* (2013.01); *H04N 21/4882* (2013.01); *H04N 21/25841* (2013.01); *H04L 67/18* (2013.01); *H04L 67/36* (2013.01)
USPC ................. 725/34; 725/33; 725/62; 725/106; 725/131

(58) Field of Classification Search
CPC .............. H04N 21/812; H04N 21/814; H04N 21/41407; H04N 7/173; H04l 12/2801
USPC ............. 725/62, 106, 131, 33–34; 455/456.1, 455/456.3
See application file for complete search history.

(56) References Cited

U.S. PATENT DOCUMENTS

| 6,198,930 B1 | 3/2001 | Schipper | |
|---|---|---|---|
| 2002/0124252 A1 * | 9/2002 | Schaefer et al. | ................ 725/33 |

(Continued)

FOREIGN PATENT DOCUMENTS

JP           2005295030         10/2005

OTHER PUBLICATIONS

Patent Cooperation Treaty, "International Search Report", ISA/EP, by Officer Anita Rothenbucher in PCT Application No. PCT/US2010/047378; Document of 12 pages dated Nov. 25, 2010.

*Primary Examiner* — Nathan Flynn
*Assistant Examiner* — Sumaiya A Chowdhury
(74) *Attorney, Agent, or Firm* — Guntin & Gust, PLC; Douglas Schnabel (57) ABSTRACT

A system that incorporates teachings of the present disclosure may include, for example, a set top box (STB) having a controller to communicate with a location server on an interactive TV network used by the STB to find a mobile communication device of a targeted party, receive information from the location server that monitors a communication network to find a location of the mobile communication device when the mobile communication device approaches or traverses a predetermined boundary or approaches a targeted location where the targeted party carries the mobile communication device operating on the communication network that has location determining functionality, and presents the location of the mobile communication device. Other embodiments are disclosed.

22 Claims, 5 Drawing Sheets

(56) References Cited

U.S. PATENT DOCUMENTS

| | | |
|---|---|---|
| 2004/0163130 A1* | 8/2004 | Gray et al. .................... 725/132 |
| 2004/0192311 A1* | 9/2004 | Koskinen et al. ............. 455/440 |
| 2004/0259573 A1* | 12/2004 | Cheng ........................ 455/456.3 |
| 2005/0136949 A1* | 6/2005 | Barnes, Jr. .................... 455/461 |
| 2007/0200695 A1* | 8/2007 | Almstrand et al. ...... 340/539.13 |
| 2007/0243880 A1 | 10/2007 | Gits et al. |
| 2008/0125098 A1 | 5/2008 | Bruce et al. |
| 2008/0233956 A1 | 9/2008 | Wyk et al. |
| 2008/0242319 A1* | 10/2008 | Paschetto et al. .......... 455/456.6 |
| 2009/0044246 A1 | 2/2009 | Sheehan et al. |
| 2009/0124232 A1* | 5/2009 | D'Arcy et al. ............. 455/404.2 |
| 2010/0222645 A1* | 9/2010 | Nadler et al. ................. 600/300 |
| 2011/0030021 A1* | 2/2011 | Campagna et al. ........... 725/106 |

\* cited by examiner

Communication Devices

FIG. 6

# METHOD AND APPARATUS USING LOCATION-BASED COMMUNICATION

FIELD OF THE DISCLOSURE

The present disclosure relates generally to method and apparatus for communication and more specifically to methods and systems using location-based communication.

BACKGROUND

Knowing the geographic location of a user operating a mobile phone can be useful. For example, a parent seeking a child operating the mobile phone can contact the child operating the mobile phone to obtain the geographic location of the child when the child has failed to check in with the parent, when the parent seeks to check up on a location of child or when the child is lost. The person trying to contract the user of the mobile phone may attempt to establish communication with the user by placing a call to the user or by sending a text message to the user in an attempt to obtain the geographic location from the user. However, if the user does not accept the call or review the text message or has poor phone coverage, the person seeking the user ordinarily will be unable to obtain the current information from the user and may become frustrated and/or concerned. Even when the user accepts the call or responds to a text message, the user may be unaware of the current geographic location or will not have a user friendly way of viewing such information. In another example, a person can efficiently direct tasks to a mobile phone user if the location of the mobile phone user is known.

DETAILED DESCRIPTION

One embodiment of the present disclosure can entail a set top box (STB) having a controller to communicate with a location server coupled to an interactive TV (iTV) network to find a mobile communication device of a targeted party, receive information via the iTV network from the location server that monitors a communication network to find a location of the mobile communication device when the mobile communication device traverses a predetermined boundary, wherein the targeted party carries the mobile communication device operating on the communication network that has location determining functionality, and present a map having a representation of the location of the mobile communication device.

Another embodiment of the present disclosure can entail a computer-readable storage medium at a STB having computer instructions for communicating with a location server via an iTV network to locate a mobile communication device to determine when the mobile communication device approaches or traverses a predetermined boundary where a targeted party carries the mobile communication device operating on the communication network that has location determining functionality, and for receiving location information from the iTV network responsive to the mobile communication device approaching or traversing the predetermined boundary.

Yet another embodiment of the present disclosure can entail a method where a network device such as a STB communicates with a location server in an iTV network to find a mobile communication device of a targeted party, receives information from the location server that monitors a wireless communication network to find a location of the mobile communication device when the mobile communication device traverses a predetermined boundary or approaches a targeted location where the targeted party carries the mobile communication device operating on the wireless communication network that has location determining functionality, and presents the location of the mobile communication device according to the received information.

Yet another embodiment of the present disclosure can entail a location server having a controller to communicate with a Set Top Box (STB) coupled to an iTV network to find a mobile communication device of a targeted party, monitor a cellular network to find a location of the mobile communication device when the mobile communication device approaches or traverses a predetermined boundary where the targeted party carries the mobile communication device operating on the cellular network that has location determining functionality, and transmit location information to the STB where the STB is used to present the location of the mobile communication device responsive to receiving the location information from the location server.

Yet another embodiment of the present disclosure can entail a mobile communication device having a controller to transmit location information to a location server monitoring a present location of the mobile communication device in a cellular network to detect a location of a mobile communication device when it approaches or traverses a predetermined boundary wherein the mobile communication device has location determining functionality and the location server is coupled to a STB via an iTV network for conveying the location of the mobile communication device to the STB.

Figure 1:
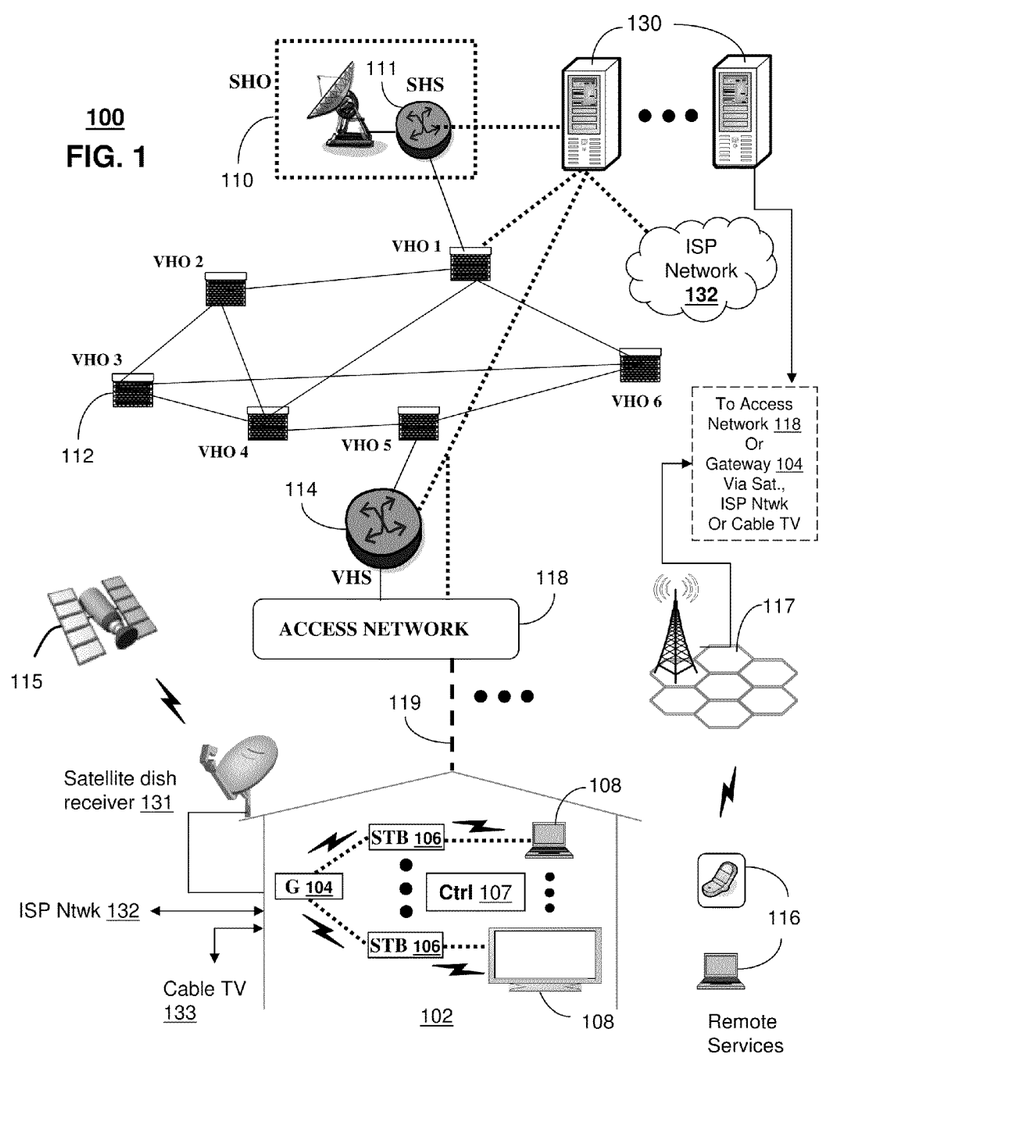
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a location server (herein referred to as location server 130). The location server 130 can use common computing and communication technology to perform the function of maintaining and updating geographic information and tracking information of a geographic location for mobile device user having the wireless communication device 116 for example. The location server 130 can obtain, store and maintain updates as to the location of the wireless communication device 116 from a communication network such as a cellular network via the wireless access base station 117. Note that the location information can be obtain via a GPS receiver residing within the wireless communication device 116 or using any number of other location detecting techniques including triangulation, time of arrival, time-distance of arrival among other techniques. Mapping information can also be stored within the location server 130, although such arrangement is not necessarily required within the embodiments. The location information of the wireless communication device 116 (can be sent to the STB 106) and requests from the STB 106 for location information of the device 116 can be sent via the location server using the access network 118 or through the gate 104 using the satellite network, the ISP network or cable TV network as alternatives. In yet another alternative, the base station 117 can send the location information to the STB 106 directly using other links.

Figure 5:
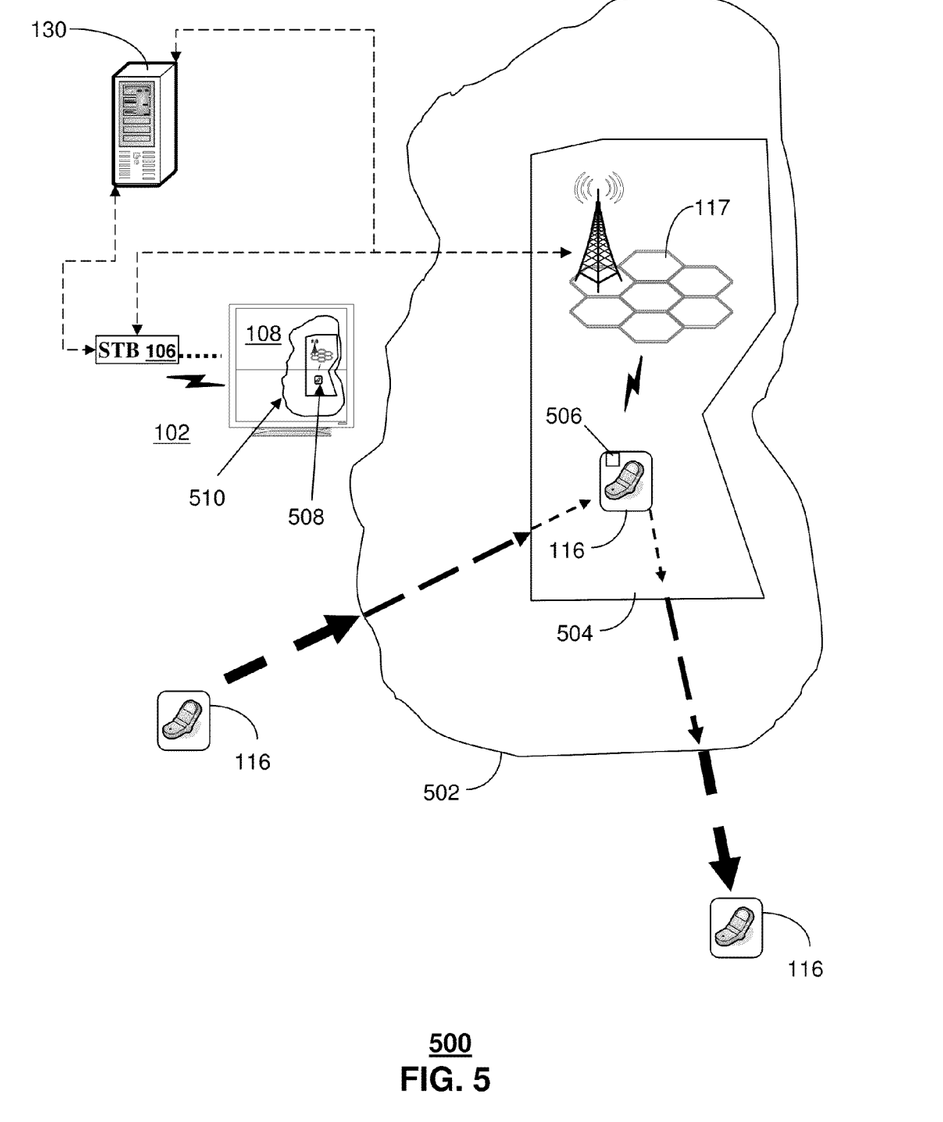
FIG. 5 depicts an illustrative embodiment of a communication system.

In a more specific example with reference to both FIGS. 1 and 5, an embodiment herein can serve as an iTV or IPTV family finder that can include both methods and devices to find family members with location detectable communication devices such as the wireless communication device 116 having a GPS receiver 506 within the communication system 500 of FIG. 5, using an STB 106. In one embodiment, an STB 106 can serve as location server (or a separate server 130 as noted above can serve as a location server) where the STB supplies a communication identifier (representative of the device 116) to find a targeted party that is carrying the device 116. The location server then monitors a communication network (such as a cellular network) having a wireless access base station 117 to find the location of the targeted party. The location can be determined using GPS or location codes associated with the base station 117, or triangulation or any number of techniques. Once found, the location server 130 can submit a map to the STB 106 with a longitude, latitude coordinate (or other coordinate scheme) to present the location of the targeted party. If triangulation is used, the location server can supply an approximate area of the targeted party.

In a parental control application, the embodiments can be enhanced by allowing a user monitoring the whereabouts of the targeted party (such as a parent) to draw a desired boundary 510 in the presentation area of presentation device 108 (corresponding to a real boundary area 502) where the representation 508 of the targeted party is found corresponding to the location of the device 116. If the targeted party as it traverses or approaches a boundary or in other words is detected near or at the boundary, a warning message such as a short messaging service (SMS) message can be sent to the user monitoring the party (Mom/Dad's cell phone or STB-TV), or to the targeted party's (child's) cell phone or to both. If the targeted party is detected outside the boundary 502, the service can automatically establish communications between the parent and child (cell to cell, IPTV to cell).

In yet another embodiment, while the targeted party is in transit, the monitoring party can submit messages (text or simulated speech) to the targeted party asking the targeted party to engage in a particular task (e.g., "Hi honey, I noticed you're near the supermarket. Please pick up a gallon of milk. We're out. Thanks."). An automatic notification or prompt can be given to the monitoring party as the targeted party approaches or traverses a boundary such as boundary 504 which can represent a supermarket in the example above. The detection and automated prompt can be trigger using a combination of techniques using identifiers for local area (a WiFi base station for the Supermarket, a location identifier associated with a cellular base station) or using known database location references associated with maps that can be stored at the location server 130 for example.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
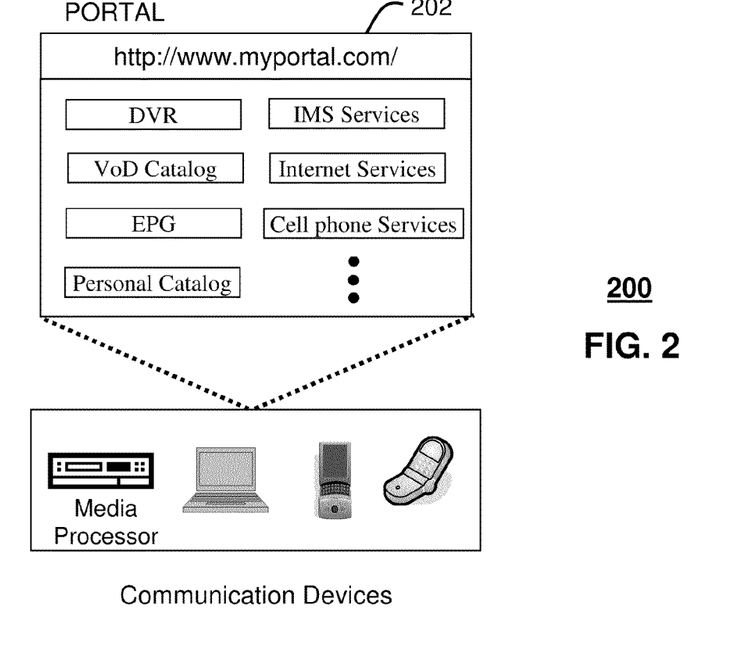
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
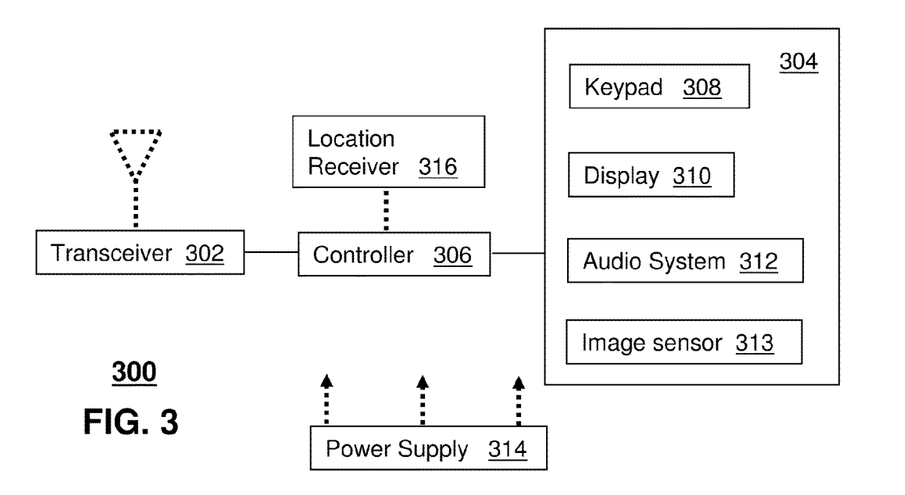
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alpha-numeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
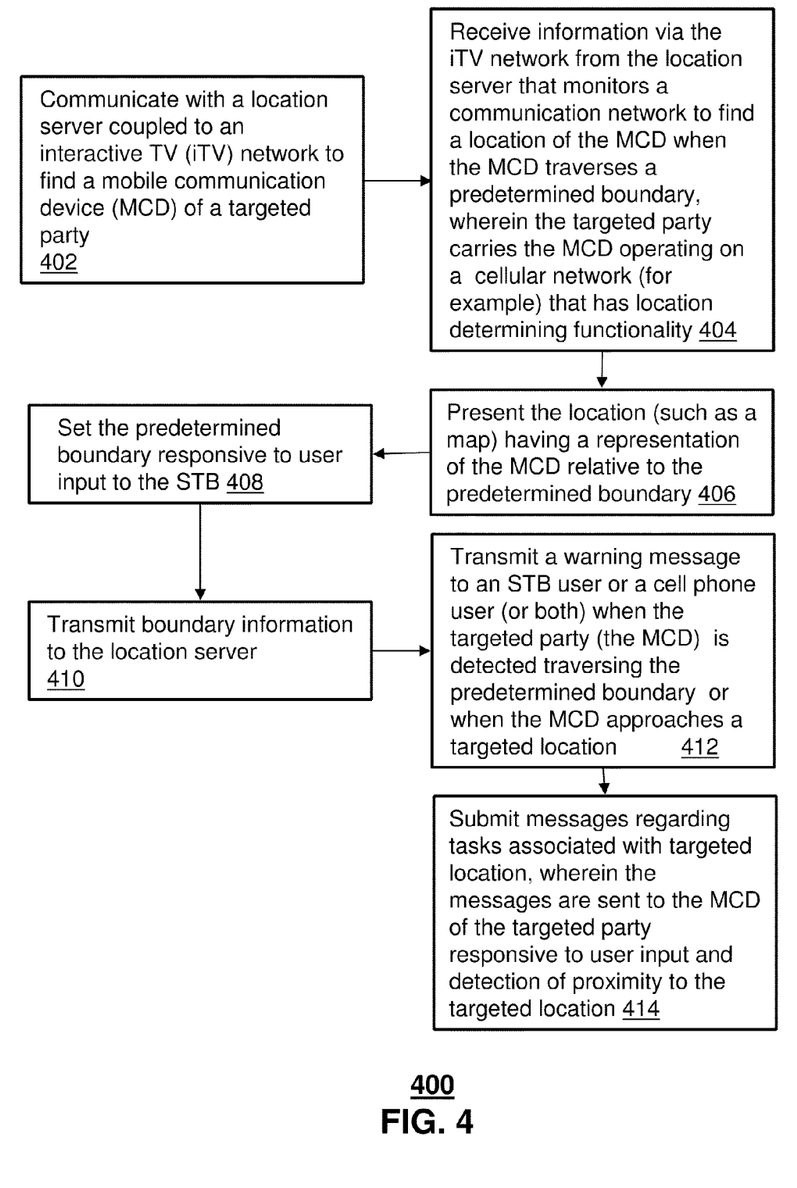
FIG. 4 depicts an illustrative embodiment of a method operating in portions of the communication system of FIG. 1.

FIG. 4 depicts an illustrative method 400 that operates in portions of the communication system of FIG. 1. Method 400 can begin with step 402 in which a STP such as STB 106 can communicate with a location server coupled to an iTV network (or an IPTV network) to find a targeted party. At 404, the method can receive information via the iTV network (or IPTV network) from the location server (such as server 130) that monitors a cellular network to find a location of the targeted party when the targeted party traverses a predetermined boundary. Traversing is intended to mean approaching within a certain proximity (either coming or going) or being on the boundary itself). Note that the targeted party carries the mobile communication device operating on the cellular network (or other network) that has location determining functionality. The method can then present a map having a representation of the location of the targeted party at 406. The mobile communication device can include a global positioning receiver and the STB receives a latitude and a longitude coordinate of the present location of the targeted party as noted above. At step 408, the user or controller at a STB can set the predetermined boundary responsive to user input to the STB. Note that the predetermined boundary can also be presented on the map responsive to the user input to the STB. At 410, the STB can transmit boundary information to the location server. A warning message can be transmitted to the STB user or the mobile device user (or both) when the targeted party is detected traversing the predetermined boundary at 412. The warning message to the STB user can be a text message sent to a cellular phone linked to the iTV network used by the STB user. Note again that the warning message can be sent to the STB user on the STB or a cellular phone owned by the STB user (such as a parent) when the targeted party is detected traversing the predetermined boundary or to the targeted party having yet another mobile device. Note further that the STB can receive information via the iTV network (or other network) from the location server that monitors the cellular network to find the location of the targeted party when the targeted party traverses the predetermined boundary or approaches a targeted location. At step 414, the STB can submit messages regarding tasks associated with targeted location where the messages are sent to the targeted party responsive to user input and detection of proximity to the targeted location.

Upon reviewing the aforementioned embodiments, it would be evident to an artisan with ordinary skill in the art that said embodiments can be modified, reduced, or enhanced without departing from the scope and spirit of the claims described below. The networks used are not necessarily limited to IPTV or iTV and the wireless communication networks should not be limited to cellular or Wifi or WiMAX. The location determining technologies are not limited to GPS and can include any number of location technologies for determining the location of a target party.

Other suitable modifications can be applied to the present disclosure without departing from the scope of the claims below. Accordingly, the reader is directed to the claims section for a fuller understanding of the breadth and scope of the present disclosure.

Figure 6:
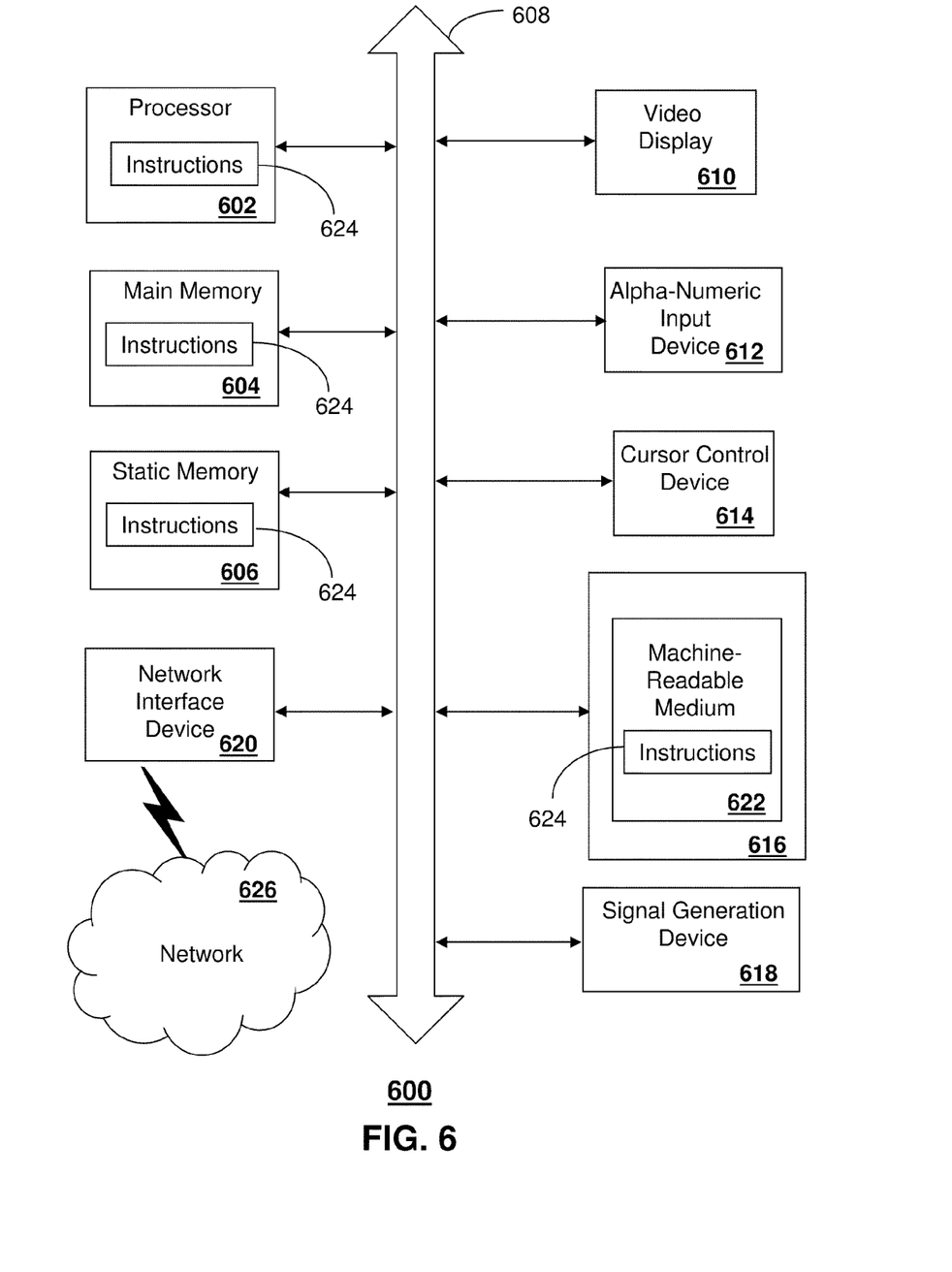
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A set top box, comprising:
a processor; and
a memory that stores executable instructions that, when executed by the processor, facilitate performance of operations, comprising:
communicating with a location server coupled to an interactive television network, wherein the location server monitors a communication network to determine a location of a mobile communication device of a targeted party relative to a predetermined boundary by power sensing, at the mobile communication device, a wireless fidelity base station located in the predetermined boundary, wherein the targeted party carries the mobile communication device operating on the communication network that has location determining functionality;
receiving, via the interactive television network, location information from the location server describing the location of the mobile communication device relative to the predetermined boundary;
receiving a task request;
matching the location information to a first task location of a plurality of task locations in a database responsive to the task request;
determining compatibility between the first task location and the task request;
generating a simulated speech task message responsive to determining of the compatibility;
transmitting the simulated speech task message to the mobile communication device;
presenting a map having a representation of the location of the mobile communication device relative to the predetermined boundary according to the location information;
transmitting a first warning message to a second communication device when the mobile communication device is detected traversing the predetermined boundary;
transmitting a second warning message to the mobile communication device of the targeted party when the mobile communication device of the targeted party is detected outside the predetermined boundary;
receiving a request from a second set top box for the location information for the mobile communication device; and
transmitting the location information from the set top box to the second set top box.

2. The set top box of claim 1, wherein the processor further performs operations comprising transmitting the map to the second set top box.

3. The set top box of claim 1, wherein the processor, responsive to executing the executable instructions, further performs operations comprising setting the predetermined boundary responsive to user input received by the set top box.

4. The set top box of claim 3, wherein the processor, responsive to executing the executable instructions, further performs operations comprising presenting the predetermined boundary on the map responsive to the user input received by the set top box and wherein the set top box includes a video processor for presenting broadcast channels.

5. The set top box of claim 3, wherein the processor, responsive to executing the executable instructions, further performs operations comprising transmitting boundary information associated with the predetermined boundary to the location server.

6. The set top box of claim 1, wherein the processor, responsive to executing the executable instructions, further performs operations comprising transmitting the warning message to a cellular phone of a user of the set top box when the targeted party is detected traversing the predetermined boundary.

7. The set top box of claim 1, wherein the set top box operates in an interactive television network, wherein the processor, responsive to executing the instructions, further performs operations comprising receiving the location information via the interactive television network from the location server when the targeted party traverses the predetermined boundary or approaches a targeted location, and wherein the interactive television network corresponds to one of an Internet protocol television network, an interactive cable television network, or an interactive satellite television network.

8. A machine-readable storage device, comprising executable instructions, which when executed by a processor, facilitate performance of operations comprising:
communicating with a location server via an interactive television network to locate a mobile communication device of a targeted party to determine when the mobile communication device approaches or traverses a predetermined boundary by power sensing, at the mobile communication device, a wireless fidelity base station located in the predetermined boundary, wherein the mobile communication device operates on a communication network that has location determining functionality;
receiving location information from the location server of the interactive television network responsive to the mobile communication device approaching or traversing the predetermined boundary;
matching the location information to a first task location of a plurality of task locations in a database responsive to a task request;
determining compatibility between the first task location and the task request;
generating a simulated speech task message responsive to determining of the compatibility;

transmitting the simulated speech task message to the mobile communication device;

transmitting a first warning message to a second communication device when the mobile communication device is detected traversing or approaching the predetermined boundary;

transmitting a second warning message to the mobile communication device of the targeted party when the mobile communication device of the targeted party is detected outside the predetermined boundary;

receiving a request from a second set top box for the location information for the mobile communication device; and transmitting the location information from the set top box to the second set top box.

9. The machine-readable storage device of claim 8, wherein the executable instructions further cause the processor to perform operations comprising transmitting the map to the second set top box.

10. The machine-readable storage device of claim 8, wherein the mobile communication device includes a global positioning receiver and the location information includes a latitude and longitude coordinate of a present location of the mobile communication device and the instructions cause the processor to further perform operations comprising presenting the present location of the mobile communication device according to the location information.

11. The machine-readable storage device of claim 8, wherein the communication network is a cellular network that uses triangulation to determine an approximate location of the mobile communication device and wherein the processor performs operations comprising receiving the approximate location to determine a present location of the targeted party.

12. The machine-readable storage device of claim 8, wherein the processor responsive to user input performs operations comprising setting the predetermined boundary, and transmitting the predetermined boundary to the location server.

13. The machine-readable storage device of claim 8, wherein the second warning message sent to the second communication device is a short messaging service message.

14. A method of location finding comprising:

communicating, by a set top box, with a location server operating in an interactive television network to find a mobile communication device;

receiving, by the set top box, location information from the location server that monitors a wireless communication network to find a location of the mobile communication device while the mobile communication device approaches or traverses a predetermined boundary or approaches a targeted location by power sensing, at the mobile communication device, a wireless fidelity base station located in the predetermined boundary, wherein the wireless communication network that has location determining functionality;

receiving, by the set top box, a task request;

transmitting, by the set top box, the task request to the location server, wherein the location server matches the location information to a first task location of a plurality of task locations in a database responsive to a task request, wherein the location server determines compatibility between the first task location and the task request, wherein the location server transmits a simulated speech task message to the mobile communication device responsive to determining of the compatibility;

presenting, by the set top box, the location of the mobile communication device according to the information that is received;

transmitting, by the set top box, a first warning message to a second communication device when the mobile communication device is detected approaching or traversing the predetermined boundary;

transmitting, by the set top box, a second warning message to the mobile communication device of a targeted party when the mobile communication device of the targeted party is detected outside the predetermined boundary;

receiving, by the set top box, a request from a second set top box for the information for the mobile communication device; and transmitting, by the set top box, the information from the set top box to the second set top box.

15. The method of claim 14, comprising:

establishing, by the set top box, the predetermined boundary;

presenting, by the set top box, the predetermined boundary by way of the set top box; and transmitting, by the set top box, the predetermined boundary to the location server responsive to user input to the set top box.

16. The method of claim 14, further comprising transmitting, by the set top box, a map based on the information to the second set top box.

17. The method of claim 14, wherein the second warning message comprises a short messaging service.

18. A location server, comprising:

a processor; and a memory that stores executable instructions that, when executed by the processor, facilitate performance of operations, comprising:

communicating with a set top box coupled to an interactive television network to find a mobile communication device;

monitoring a cellular network to find a location of the mobile communication device when the mobile communication device approaches or traverses a predetermined boundary by power sensing, at the mobile communication device, a wireless fidelity base station located in the predetermined boundary, wherein the mobile communication device operates on the cellular network that has location determining functionality;

matching the location to a first task location of a plurality of task locations in a database responsive to a task request;

generating a simulated speech task message responsive to matching the location to the first task location;

transmitting the simulated speech task message to the mobile communication device;

transmitting a first warning message to a second communication device belonging to an owner of the set top box when the mobile communication device is detected approaching or traversing the predetermined boundary; and transmitting location information to the set top box, wherein the set top box is used to present the location of the mobile communication device responsive to receiving the location information from the location server and to automatically establish communication with the mobile communication device of a targeted party when the mobile communication device of the targeted party is detected outside the predetermined boundary and wherein the set top box transmits the location information from the set top box to a second set top box and wherein the set top box transmits a second warning message to the mobile communication device of the targeted party responsive to the mobile communication device being detected outside the predetermined boundary.

19. The location server of claim 18, wherein location server extracts global positioning satellite service information from the mobile communication device having a global positioning satellite receiver and the location server transmits to the set top box a latitude and a longitude coordinate of a present location of the mobile communication device, and wherein the latitude and a longitude coordinate is used to present a map having a representation of the location of the mobile communication device.

20. The location server of claim 18, wherein the set top box transmits a map based on the location information to a second set top box.

21. A mobile communication device, comprising;
a processor; and
a memory that stores executable instructions that, when executed by the processor, facilitate performance of operations, comprising:
determining a location of the mobile communication device relative to a predetermined boundary by power sensing a wireless fidelity base station located in the predetermined boundary;
transmitting location information to a location server monitoring a present location of the mobile communication device in a cellular network, wherein the location information describes the location of the mobile communication device relative to the predetermined boundary, wherein the location server is coupled to a set top box via an interactive television network for conveying the location information of the mobile communication device to the set top box, and wherein the set top box further transmits the location information from the set top box to a second set top box, wherein the location server matches the location information to a first task location of a plurality of task locations in a database responsive to a task request, wherein the location server determines compatibility between the first task location and the task request, and wherein the location server generates a simulated speech task message according to the compatibility;
receiving the simulated speech task message from the location server; and
receiving a first warning message from the set top box when the mobile communication device is detected outside the predetermined boundary, wherein a second warning message is sent by the set top box to a second mobile communication device when the mobile communication device is detected traversing the predetermined boundary.

22. The mobile communication device of claim 21, wherein the processor further performs operations comprising transmitting the location information to the set top box through the location server and wherein the set top box presents a map having a representation of the location of the mobile communication device responsive to receiving the location information from the location server, wherein the set top box includes a video processor for presenting broadcast channels, and wherein the set top box transmits the map to a second set top box.

* * * * *